(12) United States Patent
Glebov et al.

(10) Patent No.: US 7,277,611 B1
(45) Date of Patent: Oct. 2, 2007

(54) OPTICAL INTERCONNECT PLATFORM INCLUDING BRAGG DIFFRACTIVE GRATINGS IN A BULK MATERIAL

(75) Inventors: Alexei Glebov, San Mateo, CA (US); Kishio Yokouchi, Kanagawa (JP); Leonid Glebov, Orlando, FL (US); Vadim Smirnov, Orlando, FL (US)

(73) Assignee: Fujitsu, Limited, Kawasaki (JP)

( * ) Notice: Subject to any disclaimer, the term of this patent is extended or adjusted under 35 U.S.C. 154(b) by 0 days.

(21) Appl. No.: 11/468,535

(22) Filed: Aug. 30, 2006

(51) Int. Cl.
*G02B 6/34* (2006.01)
*G02B 6/12* (2006.01)
(52) U.S. Cl. .................................. 385/37; 385/14
(58) Field of Classification Search ................ 385/14, 385/15, 24, 31, 37, 38, 53, 129; 398/152, 398/164; 372/92
See application file for complete search history.

(56) References Cited

U.S. PATENT DOCUMENTS 5,182,780 A * 1/1993 Robertson ................. 385/14
6,661,940 B2 * 12/2003 Kim ........................... 385/15
2005/0207466 A1 * 9/2005 Glebov et al. .............. 372/92
2005/0254827 A1 * 11/2005 Hopkins et al. ............ 398/164

* cited by examiner

*Primary Examiner*—Quyen P Leung
(74) *Attorney, Agent, or Firm*—Sheppard, Mullin, Richter & Hampton LLP

(57) ABSTRACT

The present invention provides an optical interconnection platform, comprising a substrate, a plurality of integrated circuits attached to a surface of the substrate wherein each integrated circuit having an array of transmitters and an array of receivers, an optical integrated circuit module attached to an opposing surface of the substrate wherein the optical integrated circuit module comprising a highly transparent photosensitive material having an input microlens that collimate the light beams before entering the optical integrated circuit module and an output microlens that focuses the light beams into the array of receivers, and input and output Bragg diffractive gratings that are formed inside of the optical integrated circuit module.

20 Claims, 4 Drawing Sheets

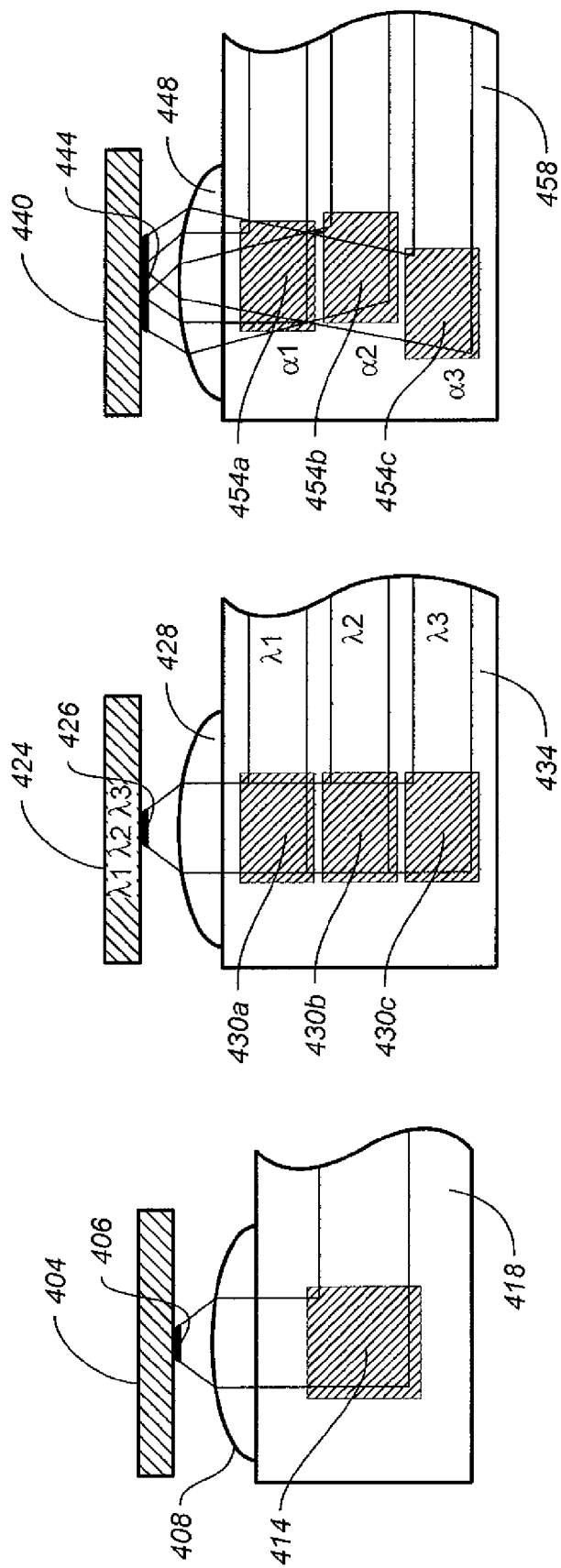

OPTICAL INTERCONNECT PLATFORM INCLUDING BRAGG DIFFRACTIVE GRATINGS IN A BULK MATERIAL

FIELD OF THE INVENTION

The present invention relates to optical interconnections and is specifically directed to an optical interconnect platform including Bragg diffractive gratings disposed in a bulk material.

BACKGROUND OF THE INVENTION

A number of approaches have been proposed for chip-to-chip and board-to-board optical interconnects, including: (1) channel waveguides; (2) free-space interconnects; and (3) through-substrate optical interconnects. Typical channel waveguide approaches featuring characteristic channel waveguides having cross-section dimensions ranging from 10 to 50 μm have been used to connect transmitters and receivers. Although channel waveguiding technologies are well established, there remain drawbacks including significant propagation losses of the waveguides and tilted mirrors for light coupling from light sources to waveguides, as well as from waveguides to detectors. Additional propagation losses of about 10 dB and higher may result from the fabrication of waveguides longer than a typical wafer size (<20 cm).

Conventional free-space interconnects approaches may result in lower propagation losses. However, such approaches create unacceptable alignment tolerances and reliability issues due to long distance air transmission. Using known through-substrate interconnect approaches, the light beam is launched in the substrate from the top surface such that it propagates along the substrate by bouncing between the top and bottom surfaces. Using these approaches, short distance propagation of less than 1 cm has been demonstrated. On the other hand, the beam collimation, scalability and alignment of refractive, reflective and diffractive elements are problematic for longer distances.

SUMMARY OF THE INVENTION

Accordingly, there is a need for an optical interconnect platform including Bragg diffractive gratings disposed in a bulk optical material.

The present invention provides a optical interconnect platform that employs volume diffractive gratings referred to herein as "Bragg diffraction gratings," "BDGs," and "gratings". In particular, the Bragg diffraction gratings are formed in photosensitive bulk material to function as light deflecting and routing elements. According to the invention, the preferred photosensitive bulk material comprises photo-thermo-refractive glass (PTRG), wherein connection between elements is produced by propagation of optical beams inside a slab of PTRG. The high transmittance and homogeneity of refractive index in a high-purity optical glass provides low-loss propagation up to at least tens of centimeters. The propagation losses in this platform can be substantially reduced compare to the conventional channel waveguide, free-space interconnects and through-substrate optical interconnect approaches.

One aspect of the invention involves an optical interconnection platform, comprising a substrate, a plurality of integrated circuits attached to a surface of the substrate wherein each integrated circuit has an array of transmitters and an array of receivers, an optical integrated circuit module attached to an opposing surface of the substrate wherein the optical integrated circuit module comprises a highly transparent photosensitive material having an input microlens that collimates the light beams before entering the optical integrated circuit module and an output microlens that focuses the light beams into the array of receivers, and input and output Bragg diffractive gratings that are formed inside of the optical integrated circuit module. By way of example, the array of transmitters may comprise light emitting diodes or vertical cavity surface emitting lasers and the array of receivers may comprise photodetectors.

In the preferred optical interconnection platform of the invention, the substrate comprises a multi-chip-module, an interposer or a board, while the highly transparent photosensitive material comprises a transparent slab of photo-thermo-refractive glass. The input and output Bragg diffraction gratings are formed in the optical integrated circuit to function as light deflecting and routing elements, wherein connection between elements is produced by propagation of light beams inside the optical integrated circuit. According to the invention, the input Bragg diffractive gratings are configured to form a 3-dimensional Bragg diffractive grating array wherein outgoing light beams are deflected in three dimensions. The angles of the outgoing light beams may be varied in the range from 0 to 180° depending on the Bragg diffractive grating parameters. The Bragg diffractive gratings are configured to be selective to predetermined incident angles and wavelengths such that the gratings will turn only the beams matching the predetermined grating parameters. In this manner, the Bragg diffractive gratings are virtually transparent for non-matching light beams. The optical interconnection platform may be configured to provide chip-to-chip or board-to-board interconnections.

Another aspect of the invention involves an optical interconnection platform, comprising a substrate, a plurality of integrated circuits attached to a surface of the substrate wherein each integrated circuit includes an array of transmitters for transmitting light beams having different wavelengths and an array of receivers, an optical integrated circuit module attached to an opposing surface of the substrate wherein the optical integrated circuit module comprises an input microlens that collimates the light beams before entering the optical integrated circuit module and an output microlens that focuses the light beams into the array of receivers, and input and output Bragg diffractive gratings that are formed inside of the optical integrated circuit module, wherein each input microlens is configured to collimate a light beam at a corresponding Bragg diffractive grating having parameters that match a corresponding wavelength of the light beam. This optical interconnection platform may be used in a wavelength division multiplexing arrangement that comprises both a medium for light beam propagation and means for controlling the propagation direction. In this embodiment, the Bragg refractive gratings may operate as a demultiplexer that spatially separates light beams having different wavelengths for propagation control.

A further aspect of the invention involves an optical interconnection platform, comprising a substrate, a plurality of integrated circuits attached to a surface of the substrate wherein each integrated circuit includes an array of transmitters for transmitting light beams, an optical integrated circuit module attached to an opposing surface of the substrate wherein the optical integrated circuit module comprises an input microlens that collimates the light beams before entering the optical integrated circuit module and an output microlens that focuses the light beams into the array of receivers, and input and output Bragg diffractive gratings that are formed inside of the optical integrated circuit module, wherein each input microlens is configured to collimate a light beam at a corresponding Bragg diffractive grating, which includes parameters for the propagation control of light beams having various incident angles. In this embodiment, the Bragg diffractive gratings overlap in the space yet work independently of each other.

These and other objects of the present invention will become apparent to those skilled in the art from the following detailed description of the invention, the accompanying drawings, and the appended claims.

BRIEF DESCRIPTION OF THE DRAWINGS

FIGS. 4A-4C illustrate various light coupling arrangements for optical interconnections based on reflecting Bragg diffractive gratings, wherein FIG. 4A depicts a single coupling arrangement, FIG. 4B depicts a WDM arrangement and FIG. 4C depicts an angular division multiplexing arrangement.

FIGS. 5A-5C illustrate various light coupling arrangements for optical interconnections based on transmitting Bragg diffractive gratings, wherein FIG. 5A depicts a single coupling arrangement, FIG. 5B depicts a WDM arrangement and FIG. 5C depicts an angular division multiplexing arrangement.

DETAILED DESCRIPTION OF THE INVENTION

In the following description, numerous specific details are set forth to provide a more thorough description of the specific embodiments of the inventions. It is apparent, however, that the inventions may be practiced without all the specific details given below. In other instances, well known features have not been described in detail so as not to obscure the invention.

Figure 1A:
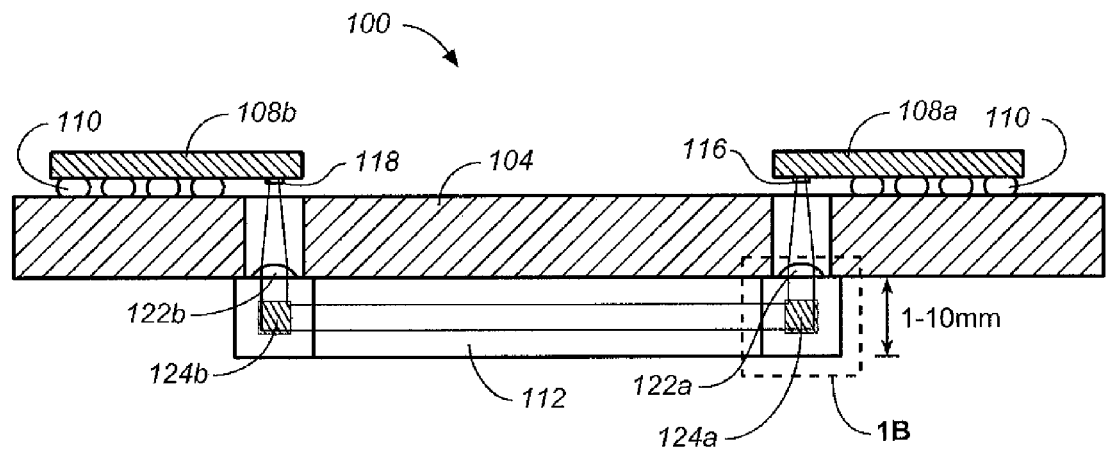
FIG. 1A is a schematic diagram illustrating a preferred optical interconnection platform for chip-to-chip interconnections, in accordance with an embodiment of the invention

Referring to FIG. 1A, a preferred optical interconnection platform 100 for chip-to-chip interconnections comprises a substrate 104 with two integrated circuits (ICs) 108a, 108b attached to one side of the substrate 104 and an optical integrated circuit (OIC) module 112 attached to the opposite side of the substrate 104. In particular, each IC 108 is preferably flip-chip bonded on the substrate 104 using solder bumps 110, the substrate comprising a multi-chip-module (MCM), an interposer or a board. IC 108a has at least one and, preferably, an array of optical transmitters 116 such as laser diodes (LDs) or vertical cavity surface emitting lasers (VCSELs), and IC 108b has at least one and, preferably, an array of optical receivers 118 such as photodetectors that are located on the bottom side of the IC 108. While only one optical transmitter 116 and one optical receiver 118 is shown in FIG. 1A, in a preferred embodiment both IC's 108a and 108b have arrays of both optical transmitters and optical receivers. The OIC module 112 is attached at a bottom surface of the substrate 104. Microlens arrays 122a, 122b including input and output microlenses, respectively, are either formed in the OIC module 112 or are attached thereto. In operation, input microlens 122a collimates the light emitted by optical transmitter 116 before it enters the OIC module 112, while the output microlens 122b focuses the light from the OIC module onto optical photodetector 118.

In accordance with a preferred embodiment of the invention, OIC module 112 is fabricated from a single transparent slab of photo-thermo-refractive glass (PTRG) or may comprise PTRG in combination with regular optical glass slabs, wherein Bragg diffractive gratings 124 (BDGs) including input BDGs 124a and output BDGs 124b are formed inside of the PTRG. In particular, the Bragg diffraction gratings are formed in the PTRG to function as light deflecting and routing elements, wherein connection between elements is produced by propagation of optical beams inside the slab of PTRG. The high transmittance and homogeneity of refractive index of a high-purity optical glass such as PTRG provides propagation losses that are substantially lower than the propagation losses that can be attained in a conventional optical waveguide platforms. The exemplary platform 100 depicted in FIG. 1A is merely one of the numerous potential implementations that are within the scope of the invention.

With further reference to FIG. 1A, the optical interconnection platform 100 is configured such that light from optical transmitters 116 enters the OIC module 112 at the right hand side, and the input BDGs 124a deflect the light by about 90° in the plane of the drawing. According to the invention, the diffracted beams can be deflected in selected directions depending on the orientation of the input BDGs 124a. After being deflected, the collimated light beams propagate within the slab of the OIC module 112 with very low propagation losses until the beams reach the output BDGs 124b. Losses as low as 0.01 dB/cm are easily achievable in optical quality glasses. Output BDGs 124b deflect the beams approximately 90° in the plane of the drawing such that the beams pass through the output microlens 122b and into optical receivers 118.

Bragg diffraction gratings can be formed which are highly selective to the incident angle and wavelength of light reaching the gratings. In one embodiment of the present invention, this selectivity is employed to manufacture OIC modules 112 with a high degree of integration and flexibility, thereby enabling three-dimensional (3D) routing arrangements and high transparency. Even where the channel diameter is relatively large (e.g., >0.5 mm), a great number of channels oriented in different directions can be placed in the same volume of glass thereby providing a high level of integration. As set forth below, wavelength and space division multiplexing combined with the ability to form multiple gratings in the small volume of PTRG may be used to further increase in packaging density. The OIC modules 112 are preferably solid, integrated units, such that their reliability is superior to other interconnect solutions requiring the alignment of parts. According to some embodiments of the invention, the OIC modules 112 are reconfigurable.

Figure 1B:
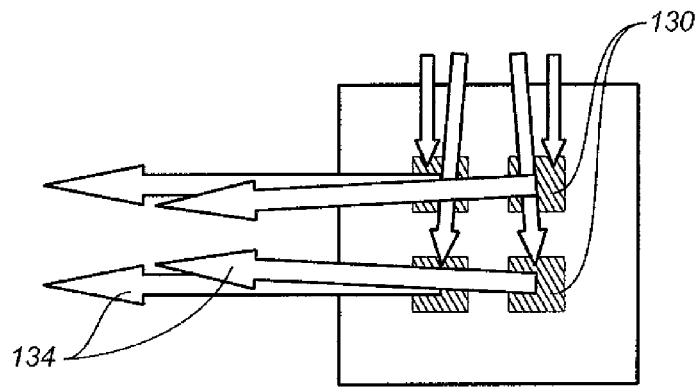
FIG. 1B is an enlarged view of a portion of the embodiment shown in FIG. 1A.

FIG. 1B depicts schematically that the input BDGs 124a may be configured to form a three-dimensional Bragg diffractive grating array 130 wherein the outgoing beams 134 are deflected in three dimensions. The angles of the outgoing beams 134 may be varied in the range from 0 to 180° depending on the grating parameters. In the illustrated embodiment, four gratings are formed in a single plane within a relatively small volume of PTRG. The potential channel density is increased when the gratings overlap in the same space. The gratings may be configured to be selective to predetermined incident angles (e.g., about 1 mrad) and wavelengths (e.g., about 2 nm), such that the gratings will selectively deflect only those light beams matching the predetermined grating parameters. For non-matching beams, the gratings are virtually transparent. Grating efficiencies as high as 95-98% may be achieved, thereby resulting in a turning loss of less than 0.2-0.3 dB. The value of maximum refractive index modulation in PTRG is approximately $10^{-3}$ (1000 ppm), which permits the recording of high-efficiency gratings in a volume of less than 1 mm³. Theoretically, 1 cm³ of PTR glass can therefore contain more than 1000 Bragg diffractive gratings.

Figure 2A:
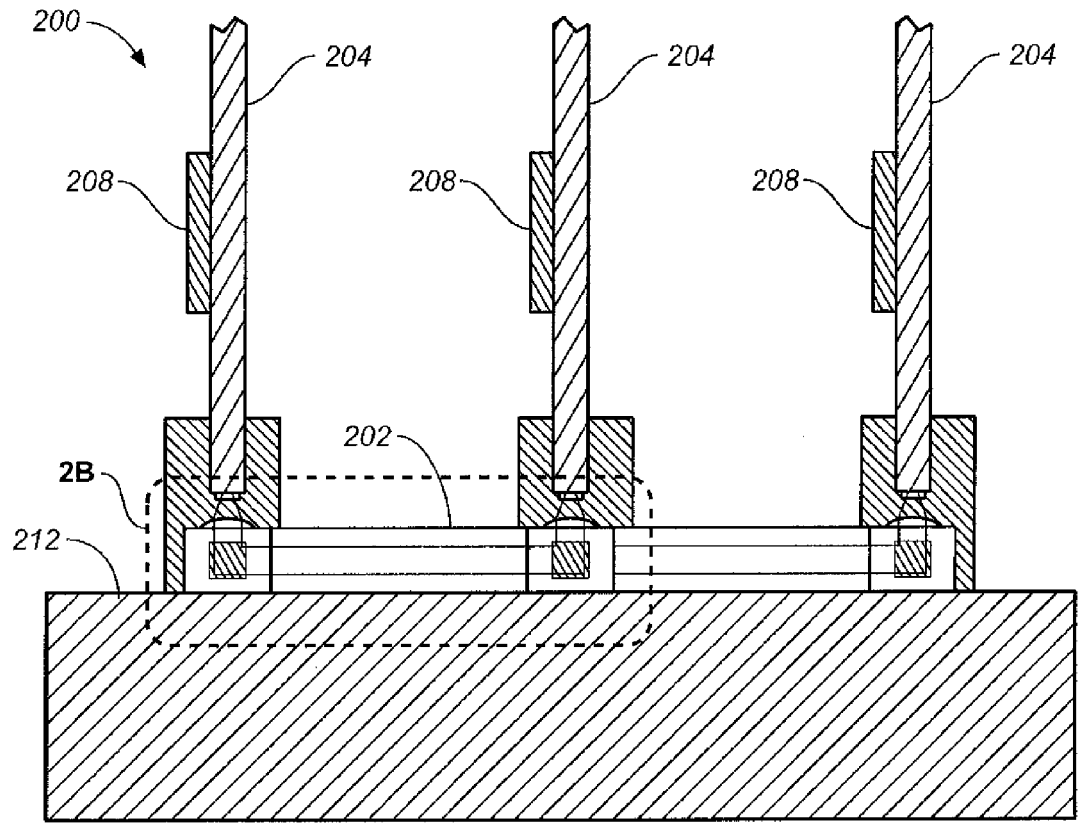
FIG. 2A is a schematic diagram illustrating a preferred optical interconnection platform for board-to-board interconnections, in accordance with an embodiment of the invention
Figure 2B:
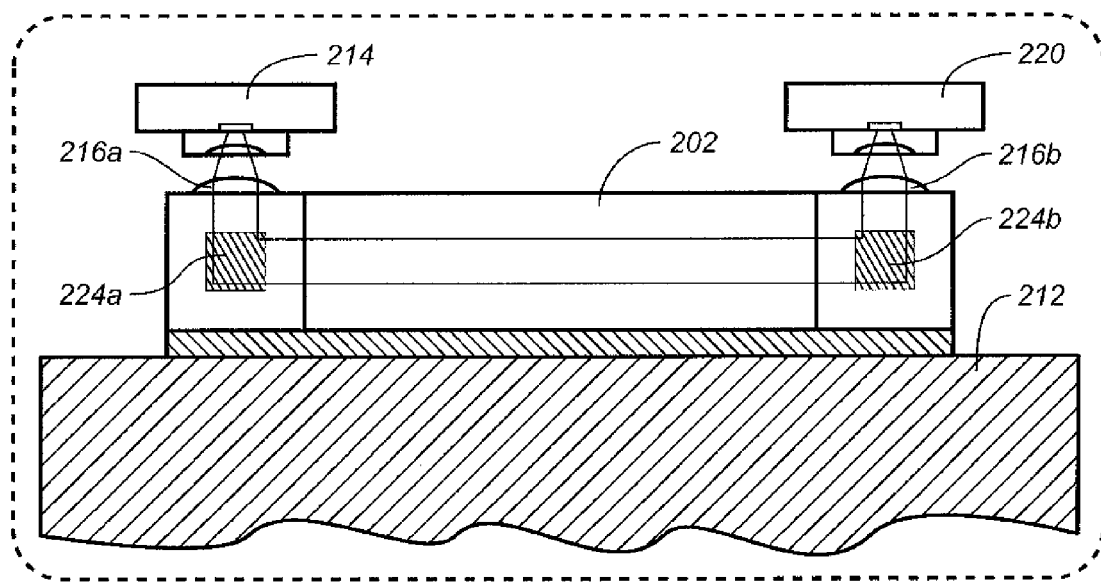
FIG. 2B is an enlarged view of a portion of the embodiment shown in FIG. 2A.

Referring to FIGS. 2A and 2B, in a preferred board-to-board interconnect platform 200, an OIC module 202 is employed to connect two or more printed circuit boards (PCBs) 204, similar to the chip-to-chip interconnections of FIG. 1A. Each PCB 204 has one or more ICs 208 attached thereto, and the PCBs 204 are connected to a backplane substrate 212. More particularly, one or more OIC modules 202 are positioned on the substrate 212 (or under the substrate 212). In the exemplary embodiment of FIGS. 2A and 2B, the board-to-board interconnect platform 200 is configured such that light enters the OIC module 202 at the left hand side from light source (optical transmitter) 214. Input microlens 216a collimates the light beam before it is deflected by about 90° by the input BDG 224a formed within OIC module 202. Then the light beam propagates within the glass slab of the OIC module 202 until it is deflected by output BDG 224b. Output microlens 216b focuses the light beams onto photodetector 220.

Figure 3:
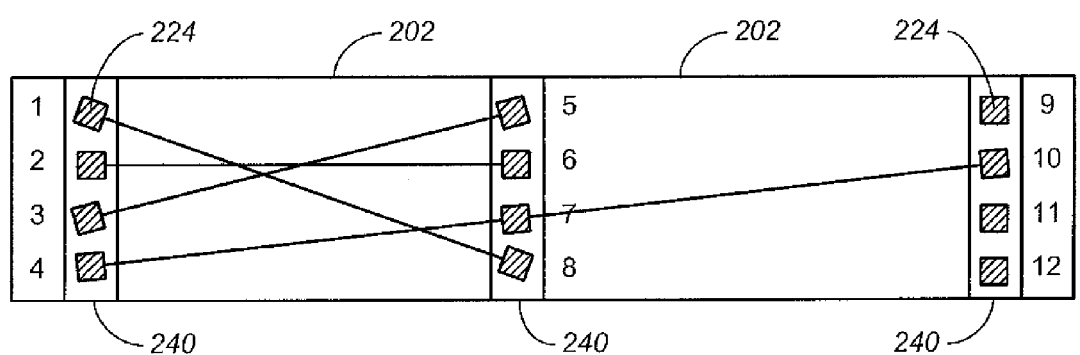
FIG. 3 is a schematic diagram illustrating a top view of the board-to-board interconnect platform of FIG. 2A.

FIG. 3 is a schematic diagram illustrating a top view of the board-to-board interconnect platform 200 of FIG. 2A, having three blocks 240 of BDGs 224 that are separated by a pair of OIC modules 202. The BDGs 224 are formed in photorefractive glass and with four channels per board (i.e., channels 1-12). The tilt and rotation angles of the gratings determine the direction of the deflected light beams. In the illustrated embodiment, channel 1 is formed to deflect light to channel 8, while channel 3 is, in the same manner, connected to channel 5. Additionally, channel 4 is connected to channel 10, such that the light beam crosses grating 7 of the second block on the way to channel 10. However, grating 7 does not affect the beam propagation because its parameters do not match the properties of the light beam propagating from grating 4 to grating 7. The high transparency of the BDGs used in board-to-board interconnect platform 200 of the present invention allows compact configurations which would not be practical using conventional OIC approaches.

With further reference to FIG. 3, according to an aspect of the invention, the board-to-board interconnect platform 200 may comprise a modular assembly, wherein the BDG blocks 240 are separate and readily detachable from the glass slabs that form the OIC modules 202. As such, the board-to-board interconnect platform 200 may be reconfigured by merely replacing one or more BDG block(s) 240 with another block(s) having a different BDG routing arrangement. This enables reconfiguration of the optical integrated circuit without removing the entire backplane. According to further embodiments of the invention, dynamic rerouting may be achieved using wavelength division multiplexing (WDM). However, the use of WDM will reduce the total interconnect density.

FIGS. 4A-4C illustrate various light coupling arrangements for optical interconnections based on the "reflecting" Bragg diffractive gratings of the present invention. More particularly, FIG. 4A depicts a single coupling arrangement, FIG. 4B depicts a WDM arrangement and FIG. 4C depicts an angular division multiplexing arrangement. The single coupling arrangement of FIG. 4A comprises an IC 404 including an optical transmitter 406 such as a VCSEL or LD for transmitting a light beam, an input microlens 408 for collimating the light beam onto a single BDG 414, which deflects the beam by about 90° such that the collimated light beams propagate along a glass slab of an OIC module 418 with very low propagation losses.

Referring to FIG. 4B, the WDM arrangement comprises an IC 424 having a tunable optical transmitter 426, such as a tunable LD, or an array of optical transmitters for transmitting light beams having different wavelengths $\lambda_1, \lambda_2, \lambda_3$, and an input microlens 428 for collimating the light beams. BDGs 430a, 430b, 430c, are formed to have parameters to selectively interact with the corresponding wavelengths $\lambda_1, \lambda_2, \lambda_3$. For example, the light beam with wavelength $\lambda_3$ is deflected by the lower grating 430c, while passing through the other two gratings 430a, 430b without being affected. Similarly, the light beam with wavelength $\lambda_2$ is deflected by the middle grating 430b, while passing through grating 430a without being affected, and the beam with wavelength $\lambda_1$ is deflected by the top grating 430a. The BDGs 430a, 430b, 430c are formed to have parameters that collimate the corresponding light beams having wavelengths $\lambda_1, \lambda_2, \lambda_3$, respectfully, such that they propagate along OIC module 434 with very low propagation losses. This WDM arrangement enables dynamic reconfiguration of the system using tunable wavelength lasers.

In the angular division multiplexing arrangement illustrated in FIG. 4C, an IC 440 comprises a plurality of optical transmitters 444 such as VCSELs or LDs for transmitting light beams onto input microlens 448 such that the light beams are provided at incident angles $\alpha_1, \alpha_2, \alpha_3$ with respect to corresponding gratings 454a, 454b, 454c. In particular, the gratings 454a, 454b, 454c are formed to selectively interact with light beams having the incident angles $\alpha_1, \alpha_2, \alpha_3$, such that the gratings 454a, 454b, 454c collimate the light beams along OIC module 458.

Figure 5C:
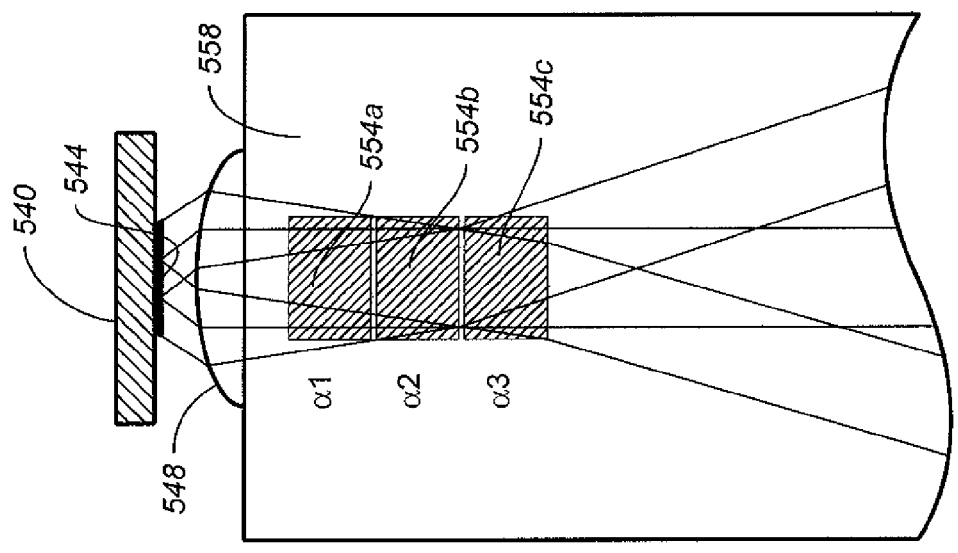
Figure 5B:
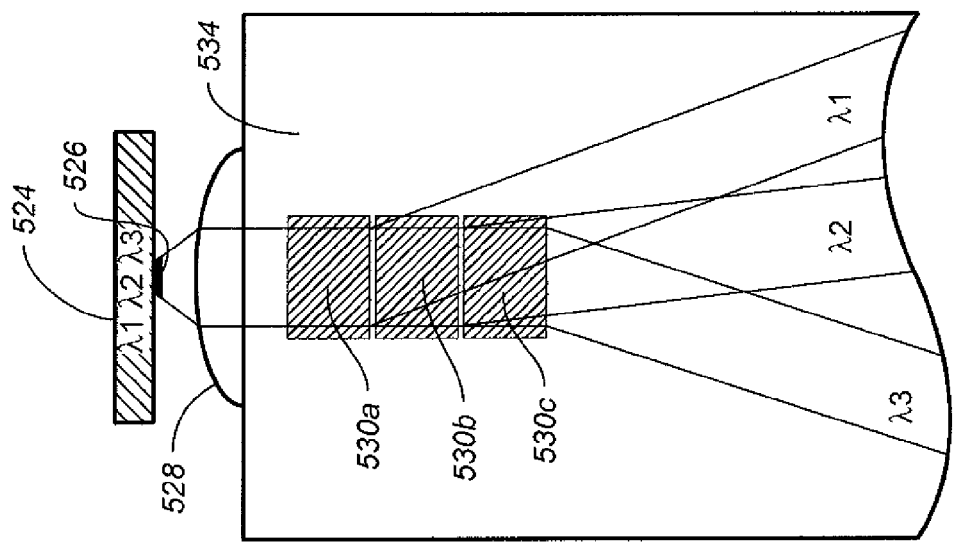
Figure 5A:
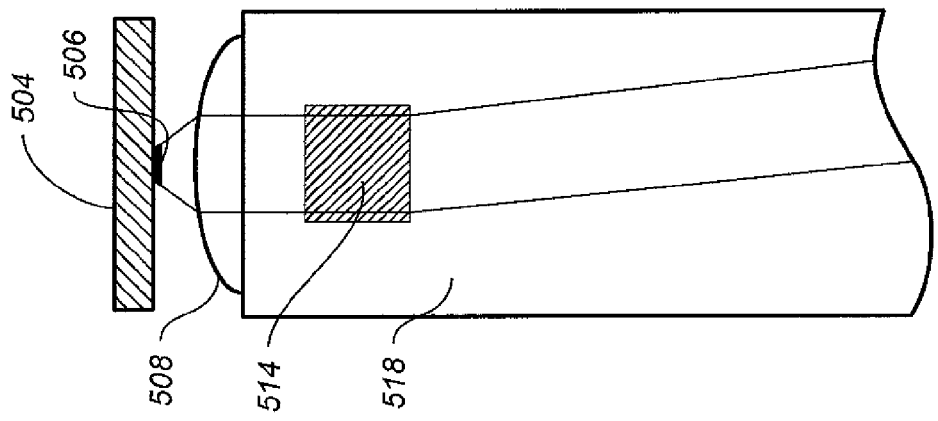

FIGS. 5A-5C illustrate another embodiment of the present invention having light coupling arrangements for optical interconnections based on "transmitting" Bragg diffractive gratings. Specifically, FIG. 5A depicts a single coupling arrangement, FIG. 5B depicts a WDM arrangement and FIG. 5C depicts an angular division multiplexing arrangement. The single coupling arrangement illustrated in FIG. 5A comprises an IC 504 including an optical transmitter 506 such as a VCSEL or LD for transmitting a light beam, an input microlens 508 for collimating the light beam onto a BDG 514, which deflects the light beam at a predetermined angle within OIC module 518.

Referring to FIG. 5B, the WDM arrangement comprises an IC 524 having an optical transmitter 526 such as a tunable LID for transmitting light beams having different wavelengths $\lambda_1, \lambda_2, \lambda_3$, an input microlens 528 for collimating the light beams, and gratings 530a, 530b, 530c for deflecting selected wavelengths. The BDGs 530a, 530b, 530c are formed to have parameters that match (selectively interact with) one of the corresponding wavelengths $\lambda_1, \lambda_2, \lambda_3$ and deflect the selected light beam at a predetermined angle within OIC module 534. In the WDM arrangement, gratings 530a, 530b, 530c can also operate as a demultiplexer that spatially separates light beams with different wavelengths $\lambda_1, \lambda_2, \lambda_3$, arriving from the same fiber or waveguide. This configuration can be used in reverse to allow multiplexing of light beams arriving from different directions and then rerouting the light beams in the same fiber or waveguide.

FIG. 5C depicts an embodiment of the invention that features angular division multiplexing. In particular, the angular division multiplexing includes an IC 540 having a plurality of optical transmitters 544 such as VCSELs or LDs for transmitting light beams onto an input microlens 548 such that the light beams are steered at angles $\alpha_1, \alpha_2, \alpha_3$ with respect to corresponding gratings 554a, 554b, 554c. The BDGs 554a, 554b, 554c are formed to have parameters for the propagation control of light beams having the incident angles $\alpha_1, \alpha_2, \alpha_3$, such that the gratings 554a, 554b, 554c deflect and collimate the light beams within OIC module 558. In the illustrated embodiment, three transmitters 544 are placed very close to each other on the IC 540, wherein the light beams from each transmitter are slightly deflected on the collimating lens 548 (or separate grating or prism). Each of the three BDGs 554a, 554b, 554c matches the incident beam angle $\alpha_1, \alpha_2, \alpha_3$ from a given transmitter 544 and deflects the light beam selectively while being transparent with respect to the other light beams. Thus, all three gratings 554a, 554b, 554c may overlap in the space yet work independently. In this manner, angular division multiplexing allow for further densification of the OICs.

The transmitting BDGs illustrated in FIG. 5 may be based on methods of light direction control similar to that of the reflecting BDGs of FIG. 4. In particular, the gratings deflect the light beams passing as they pass through. In the single grating arrangement of FIG. 5A, the grating 514 deflects a single light beam passing, whereas the WDM arrangement of FIG. 5B allows the separation of the light beams with different wavelengths passing a sequence of BDGs 530a, 530b, 530c. As set forth hereinabove, this allows the BDGs 530a, 530b, 530c to be formed in the same volume of PTRG. This arrangement may also act as a build-in multiplexer or demultiplexer for WVDM data transfer mode. The angle division multiplexing illustrated in FIG. 5C operates in a similar manner as the reflecting gratings.

Preferably, the gratings of the present invention are formed using a photo-thermal process. The photo-thermal process is a multi-step process based on precipitation of dielectric microcrystals in the bulk of glass exposed to UV radiation, which causes refractive index decrement in an exposed area. The initial step involves the exposure of the glass to UV radiation, which produces an ionization of a cerium ion. In the next stage, the electrons released from cerium are then trapped by a silver ion converting it to a neutral atom. This step corresponds to a latent image formation and no significant coloration or refractive index variations occur. The next step involves the diffusion of silver atoms, which leads to creation of tiny silver crystals at temperatures 450-500° C. These silver particles serve as the nucleation centers for sodium fluoride crystal growth at temperatures between 500° C. and 550° C. After this step, a refractive index of the exposed area decreases for about 1000 ppm, which is enough to form high efficiency Bragg gratings in glass having a thickness of about several hundreds of microns or more.

The refractive index of PTRG decreases after UV exposure followed by thermal development at temperatures above 480° C., wherein the maximum increment of refractive index is about 600 ppm, which is enough for 100% diffraction efficiency of Bragg gratings with thicknesses of more than several hundreds of nanometers. The primary advantages of PTRG Bragg gratings include high spectral and angular selectivity. These advantages may be achieved for thickness above 1 mm. The absolute value of induced refractive index decrement increases with increasing of both exposure and the period of thermal development. There is a linear dependence of increment on exposure dose up to an increment value of about 300 ppm. High absolute diffraction efficiencies of 90% and greater have been is observed for exposures ranging between 50 mJ/cm$^2$ and 5 J/cm$^2$. This indicates that PTRGs exhibit photosensitivity comparable with the best organic and inorganic materials. The laser damage threshold of PTRGs in the nanosecond region is about 30% compared to the best optical glasses.

Diffractive gratings in PTRGs are formed by exposure to interference patterns of radiation of He—Cd (325 µm) lasers followed by heat treatment at 500-520° C. The photosensitivity of PTRG is ranged from 280 nm to about 350 nm. Therefore, a number of commercial lasers can be used for hologram recording in PTRGs. An effective induced refractive index in transmitting Bragg gratings reaches the value of 1000 ppm. This value together with low losses allows the writing of high efficiency volume holograms in glass plates with thickness from several hundreds of microns to several millimeters. Thickness limiting may be determined by the depth of exciting (writing) radiation penetration in the glass plate. For example, at 325 nm PTRG is suitable for hologram recording in samples with thickness up to 3 mm. However, the 3 mm limitation can be overcome if the holograms are formed at longer wavelengths or in different geometries. It is expected that further improvement of PTRG technology will allow recording in 1-2 cm samples at any wavelength within glass sensitivity region.

It has been found that the absolute diffraction efficiency of transmitting Bragg gratings in PTRGs could exceed values of 95%. No significant dependence of diffraction efficiency on spatial frequency can be observed in the region from 50 mm$^{-1}$ to 5000 mm$^{-1}$. Angular selectivity of transmitting holograms in PTRG depends on spatial frequency and thickness and may be ranged from about 100 grad to approximately 5 mrad. Taking into account that usual divergence of near IR lasers is ranged from 0.1 to 1 mrad, one may observe that high-selectivity gratings may be employed for angular selection and beam shaping, while low-selectivity gratings may be employed for attenuation, beam probe and beam splitting with low level of radiation distortions.

Spectral selectivity of transmitting Bragg gratings in PTRG depends on spatial frequency and thickness, and ranges from fractions of nanometers to several nanometers. Such Bragg gratings can be used for multi-wavelength laser systems with wavelength separation in the range of a several nanometers. At the same time, spectral width of most powerful lasers working in the near IR region does not exceed one tenth of nanometer and no additional spectral selection is produced by transmitting Bragg gratings in PTRG. The properties of PTRG allow independent recording of phase gratings with various parameters in the same volume of glass. In operation, thermo development is applied with a predetermined exposure such that each grating has a substantially equivalent diffraction efficiency.

While the present inventions have been particularly described with respect to the illustrated embodiments, it will be appreciated that various alterations, modifications and adaptations may be made based on the present disclosure, and are intended to be within the scope of the present inventions. While the inventions have been described in connection with what are presently considered to be the most practical and preferred embodiments, it is to be understood that the present inventions are not limited to the disclosed embodiments but, on the contrary, are intended to cover various modifications and equivalent arrangements included within the scope of the appended claims.

What is claimed is:

1. An optical interconnection platform, comprising:
   a substrate;
   a plurality of integrated circuits attached to a surface of the substrate, at least one of said integrated circuits having an optical transmitter and another of said integrated circuits an optical receiver;
   an optical integrated circuit module attached to the substrate, the optical integrated circuit module comprising a transparent material, the optical integrated circuit module having an input microlens adjacent said optical transmitter to collimate the light from said transmitter before it enters the optical integrated circuit module and an output microlens to focus light onto said optical receiver; and
   input and output Bragg diffractive gratings that are formed inside of the optical integrated circuit module.

2. The optical interconnection platform of claim 1, wherein the optical transmitter comprises a light emitting diode or a vertical cavity surface emitting laser.

3. The optical interconnection platform of claim 1, wherein the optical receiver comprises a photodetector.

4. The optical interconnection platform of claim 1, wherein the output Bragg diffractive gratings deflect the beams approximately 90° such that the beams pass through the output microlens and into the optical receiver.

5. The optical interconnection platform of claim 1, wherein the substrate comprises a multi-chip-module, an interposer or a board.

6. The optical interconnection platform of claim 1, wherein the transparent material comprises a slab of photo-thermo-refractive glass.

7. The optical interconnection platform of claim 1, wherein the input and output Bragg diffraction gratings are formed in the optical integrated circuit to function as light deflecting and routing elements, and wherein connection between elements is produced by propagation of light beams inside the optical integrated circuit.

8. The optical interconnection platform of claim 1, wherein the input Bragg diffractive gratings are configured to form a 3-dimensional Bragg diffractive grating array wherein outgoing light beams are deflected in three dimensions.

9. The optical interconnection platform of claim 8, wherein the angles of the outgoing light beams may be varied in the range from 0 to 180° depending on the Bragg diffractive grating parameters.

10. The optical interconnection platform of claim 1, wherein the Bragg diffractive gratings are configured to be selective to predetermined incident angles and wavelengths such that the gratings will deflect only the beams matching the predetermined grating parameters.

11. The optical interconnection platform of claim 1, wherein the Bragg diffractive gratings are transparent for non-matching light beams.

12. The optical interconnection platform of claim 1, wherein the platform is configured to provide chip-to-chip interconnections.

13. The optical interconnection platform of claim 1, wherein the platform is configured to provide board-to-board interconnections.

14. An optical interconnection platform, comprising:
   a substrate;
   a plurality of integrated circuits attached to a surface of the substrate, at least one of said integrated circuits having an optical transmitter and another of said integrated circuits an optical receiver;
   an optical integrated circuit module attached to the substrate, the optical integrated circuit module comprising a transparent material, the optical integrated circuit module having an input microlens adjacent said optical transmitter to collimate the light from said transmitter before it enters the optical integrated circuit module and an output microlens to focus light onto said optical receiver; and
   input and output Bragg diffractive gratings that are formed inside of the optical integrated circuit module;
   wherein the input microlens is configured to collimate a light beam at a corresponding Bragg diffractive grating, which includes parameters that match a corresponding wavelength of the light beam.

15. The optical interconnection platform of claim 14, wherein the optical interconnection platform is based on a wavelength division multiplexing arrangement.

16. The optical interconnection platform of claim 15, wherein the wavelength division multiplexing arrangement enables dynamic reconfiguration of the system using tunable wavelength VCSELs.

17. The optical interconnection platform of claim 14, wherein the optical integrated circuit module comprises both a medium for light beam propagation and means for controlling the propagation direction.

18. The optical interconnection platform of claim 14, wherein the Bragg refractive gratings operate as a demultiplexer that spatially separates light beams having different wavelengths for propagation control.

19. An optical interconnection platform, comprising:
   a substrate;
   a plurality of integrated circuits attached to a surface of the substrate, at least one of said integrated circuits having an optical transmitter and another of said integrated circuits an optical receiver;
   an optical integrated circuit module attached to the substrate, the optical integrated circuit module comprising a transparent material, the optical integrated circuit module having an input microlens adjacent said optical transmitter to collimate the light from said transmitter before it enters the optical integrated circuit module and an output microlens to focus light onto said optical receiver; and
   input and output Bragg diffractive gratings that are formed inside of the optical integrated circuit module;
   wherein the input microlens is configured to collimate a light beam at a corresponding Bragg diffractive grating, which includes parameters for the propagation control of light beams having various incident angles.

20. The optical interconnection platform of claim 19, wherein the Bragg diffractive gratings overlap in the space yet work independently of each other.

* * * * *